US009056752B2

(12) United States Patent
Müller et al.

(10) Patent No.: US 9,056,752 B2
(45) Date of Patent: Jun. 16, 2015

(54) CRANE, IN PARTICULAR MOBILE PORT CRANE, COMPRISING A HYBRID DRIVE SYSTEM

(75) Inventors: Jörg Müller, Dormagen (DE); Johannes Reiβ, Hilden (DE)

(73) Assignee: Terex MHPS GmbH, Duesseldorf (DE)

( * ) Notice: Subject to any disclaimer, the term of this patent is extended or adjusted under 35 U.S.C. 154(b) by 373 days.

(21) Appl. No.: 13/577,596

(22) PCT Filed: Feb. 10, 2011

(86) PCT No.: PCT/EP2011/051999
§ 371 (c)(1),
(2), (4) Date: Aug. 7, 2012

(87) PCT Pub. No.: WO2011/098542
PCT Pub. Date: Aug. 18, 2011

(65) Prior Publication Data

US 2012/0305513 A1 Dec. 6, 2012

(30) Foreign Application Priority Data

Feb. 11, 2010 (DE) ......................... 10 2010 007 545

(51) Int. Cl.
*H02P 7/00* (2006.01)
*B66C 13/28* (2006.01)

(52) U.S. Cl.
CPC ..................................... *B66C 13/28* (2013.01)

(58) Field of Classification Search
CPC ....................................................... B66C 13/28
USPC ............................................. 318/140, 51, 53
See application file for complete search history.

(56) References Cited

U.S. PATENT DOCUMENTS 7,378,808 B2 * 5/2008 Kuras et al. .................. 318/139
7,554,278 B2 6/2009 Wegner-Donnelly et al.

(Continued)

FOREIGN PATENT DOCUMENTS

DE 19530110 A1 2/1997
DE 102004010988 A1 9/2005

(Continued)

OTHER PUBLICATIONS

International Search Report mailed May 11, 2011, from corresponding International Application No. PCT/EP2011/051999.
English Translation of the International Preliminary Report on Patentability from the International Bureau for corresponding International Application No. PCT/EP2011/051999 issued Aug. 14, 2012.

*Primary Examiner* — David S Luo
(74) *Attorney, Agent, or Firm* — Gardner, Linn, Burkhart & Flory, LLP

(57) ABSTRACT

A crane comprising a diesel-electric drive, the three-phase generator of which supplies an AC voltage circuit, further comprising a DC voltage circuit connected to the AC voltage circuit, electric motors which drive at least one rotating mechanism, a lifting mechanism and a luffing mechanism of the crane, at least one brake resistor, and a short-term energy store, which is connected to the AC voltage circuit or to the DC voltage circuit for the intermediate storage of excess energy. At least one of the electric motors is connected to the AC voltage circuit and at least one is connected to the DC voltage circuit, and the AC voltage circuit is connected to the DC voltage circuit via a rectifier such that an energy exchange is possible between the AC voltage circuit and the DC voltage circuit.

22 Claims, 2 Drawing Sheets

(56) References Cited

U.S. PATENT DOCUMENTS

| | | | | |
|---|---|---|---|---|
| 7,880,436 | B2 * | 2/2011 | Fischer et al. | 320/124 |
| 7,882,937 | B2 * | 2/2011 | Okada | 187/296 |
| 8,718,881 | B2 * | 5/2014 | Bixel et al. | 701/50 |
| 2008/0048497 | A1 | 2/2008 | Donnelly et al. | |
| 2008/0121444 | A1 | 5/2008 | Bauer | |
| 2008/0246436 | A1 | 10/2008 | Fischer et al. | |

FOREIGN PATENT DOCUMENTS

| | | | |
|---|---|---|---|
| EP | 1813462 | A1 | 8/2007 |
| EP | 1925493 | A2 | 5/2008 |
| WO | 2005120883 | A1 | 12/2005 |

* cited by examiner

CRANE, IN PARTICULAR MOBILE PORT CRANE, COMPRISING A HYBRID DRIVE SYSTEM

CROSS REFERENCE TO RELATED APPLICATION

The present application claims the priority benefits of International Patent Application No. PCT/EP2011/051999, filed on Feb. 10, 2011, and also of German Patent Application No. DE 10 2010 007 545.0, filed on Feb. 11, 2010.

BACKGROUND OF THE INVENTION

The invention relates to a crane, in particular a mobile wharf crane.

German patent application DE 10 2004 010 988 A1 discloses a hybrid drive system for a straddle carrier. Such straddle carriers are used in seaports and container terminals for transporting and stacking containers. The hybrid drive system includes a current generating unit having a diesel motor which drives the three-phase generator. The three-phase generator supplies, via a rectifier, a DC voltage intermediate circuit to which traction, lifting and auxiliary motors are connected via inverters. In order to, design the current generating unit in a considerably smaller and simpler manner, a short-term energy store is connected to the DC voltage intermediate circuit via a charge/discharge regulator in order to cover short-term peaks in energy requirement such as those produced when driving and braking the traction drive of the straddle carrier or when lifting and lowering the containers. This short-term store can be charged when braking the traction and lifting drives in a generator-based manner and therefore the energy supplied back into the DC voltage intermediate circuit by the traction and lifting drives does not need to be converted into heat using break resistors. The short-term store thus eliminates these energy losses and is used as an intermediate store for the energy. The short-term energy store is formed from double-layer capacitors which are connected together, have extremely high capacitances and are also known as “ultra capacitors” or “Ultra-Caps”. In addition to the short-term energy store, a further energy store is connected to the DC voltage intermediate circuit via a further charge/discharge regulator. The further energy store is formed as a lightweight high-energy battery, in particular sodium chloride, nickel, sodium-sulphur or nickel-metal hydride storage batteries, in order to cover average peaks in power requirement which are produced for example for journeys of a few minutes. The charge/discharge regulator for the short-term energy store and the further energy store is formed as an adjustable two-quadrant DC/DC converter. Further, an electric controller is provided which is connected to the current generating unit, to the short-term energy store and to the further energy store in order control these depending upon the operating state of the hybrid drive system.

U.S. Pat. No. 7,554,278 B2 discloses a hybrid drive system of a crane with rubber tyres and having on the input-side a DC voltage circuit which is supplied with electrical energy on the one hand by a three-phase generator, driven by an internal combustion engine, having a rectifier disposed downstream, and on the other hand by a battery unit, used as an energy store system. In order to supply the electrically operated crane drive motors with energy, an AC voltage circuit is also provided by means of which all of the crane drives, in particular a lifting drive, are electrically connected. A further switching circuit is also provided which can be connected to the DC voltage circuit and via which the electrical energy recuperated e.g., when lowering a load by braking the lifting drive in a generator-based manner can be supplied into the battery unit of the energy store system for charging same.

Furthermore, so-called mobile wharf cranes are known from the current company brochure from Gottwald Port Technology GmbH, Dusseldorf, Germany, entitled “*Hafenkran—Modell* 4” (“wharf crane—model 4”), by means of which containers or bulk material are handled in seaports or container terminals. Such a mobile wharf crane consists substantially of a lower carriage, by means of which the mobile wharf crane is supported on land, e.g., on a quay, or on a floating pontoon, and an upper carriage which is mounted on the lower carriage so as to be rotatable about a vertical axis. The lower carriage can travel on the quay via tyres or on rails via rail wheels. During the handling operation, the lower carriage is supported via stanchions. Disposed on the upper carriage are a vertically extending tower, the rotating and lifting mechanisms for the rotation of the upper carriage and the lifting of a load, and a counterweight. Further, a jib is articulated on the tower approximately in the region of half of its length and on the side remote from the counterweight. The jib is connected to the tower so as to be pivotable about a horizontal luffing axis and can also be pivoted out of its laterally projecting operating position into an upright rest position via a luffing cylinder articulated on the jib and at the bottom on the upper carriage. Moreover, the jib is conventionally formed as a lattice boom.

In relation to their drive design, such mobile wharf cranes have the configuration of a serial hybrid system since they operate with a diesel-electric drive in which the chemical energy of the diesel fuel is converted into mechanical work by an internal combustion engine and is supplied as electrical energy by a three-phase generator to an AC voltage circuit. For driving the lifting mechanism, the rotating mechanism and the luffing mechanism as well as any other drives, DC current motors or three-phase motors are used in which a new conversion of the electrical energy back into mechanical work takes place, which is finally used to lift loads, move and rotate the crane or move the jib. Energy which is supplied back into the AC voltage circuit e.g., by lowering loads on the jib, is initially made available to the remaining consumers. As soon as there is excess energy in the AC voltage circuit, this is converted into heat by brake resistors, wherein the energy supplied back is eliminated, i.e., is ultimately lost.

SUMMARY OF THE INVENTION

The present invention provides a crane, in particular a mobile wharf crane, with an improved hybrid drive system.

In accordance with an embodiment of the invention, in the case of a crane, in particular a mobile wharf crane, having a diesel-electric drive, the three-phase generator of which supplies an AC voltage circuit, having a DC voltage circuit connected to the AC voltage circuit, having electric motors which drive at least a rotating mechanism, a lifting mechanism and a luffing mechanism of the crane, having at least one brake resistor and having a short-term energy store which is connected to the AC voltage circuit or to the DC voltage circuit for the intermediate storage of excess energy, an improvement in the hybrid drive system is achieved by virtue of the fact that in each case at least one of the electric motors is connected to the AC voltage circuit and to the DC voltage circuit and the AC voltage circuit is connected to the DC voltage circuit via a rectifier such that an energy exchange is possible between the AC voltage circuit and the DC voltage circuit. By using the short-term energy store for storing excess energy recuperated e.g., by braking the drives in a generator-based manner, the operating behaviour of the internal combustion engine provided for driving the three-phase generator, in particular a diesel motor, are improved such that the fuel consumption and thus the pollutant emission are lowered and the recuperated energy can be utilised in another manner. In the case of a sought modular construction of the required assemblies and functionalities, existing mobile wharf cranes can also be retrofitted with the short-term energy store as an extension. Furthermore, it is still ensured that the mobile wharf crane can continue its normal operation if the short-term energy store fails since the brake resistor is also provided. It is particularly advantageous that the rectifier connecting the AC voltage circuit and the DC voltage circuit is formed so as to be capable of feeding back energy.

The recuperation of energy is achieved in a manner by virtue of the fact that at least the electric motors of the lifting mechanism and of the luffing mechanism can be operated in a generator-based manner for feeding electrical energy back into the AC voltage circuit or into the DC voltage circuit.

In a particular embodiment, the electric motors are formed as three-phase motors.

In one embodiment, provision is made that the short-term energy store is connected to the DC voltage circuit via a DC converter. By using the DC converter, the short-term energy store can be synchronised with the DC voltage circuit in terms of the voltage level.

In a particular embodiment, provision is made that the short-term energy store is formed as a double-layer capacitor. Such double-layer capacitors have a long life, are free of maintenance, are light and also have a low energy density with a high power density. These are consequently particularly suitable as short-term energy stores. Compared with batteries, substantially higher powers can be received or output by the double-layer capacitors and in terms of their service life they are not as greatly impaired as batteries by the rapid and short-term changes between charging and discharging. Although the energy content per volume is smaller than that of batteries, these properties mean that double-layer capacitors are excellent as short-term energy stores for use in mobile wharf cranes since when lowering loads of a mobile wharf crane, extremely high powers but lower energies occur over a relatively short period of time of a few seconds and for acceleration processes during lifting and other crane movements, high peak powers occur in each case only for a short time.

In one embodiment, provision is made that the brake resistor is connected to the AC voltage intermediate circuit via a rectifier.

It is also advantageous if at least the electric motor of the luffing mechanism is connected to the AC voltage circuit.

It is advantageous that the rotating mechanism comprises a three-phase motor which is connected to the DC voltage circuit via an inverter, the lifting mechanism comprises a three-phase motor which is connected to the DC voltage circuit via an inverter, and the luffing mechanism comprises a three-phase motor which is connected directly to the AC voltage circuit. An existing AC voltage circuit can then be retrofitted with the short-term energy store with changing the design of the electrical system of an existing mobile wharf crane.

In a particular embodiment, provision is made that a power controller which is adjusted via an operational strategy, is connected to the diesel-electric drive, the brake resistor or its rectifier, the short-term energy store and the DC converter of the short-term energy store and controls the short-term energy store and if required the brake resistor on the basis of the data of an active power meter allocated to the three-phase generator and of the charging state of the short-term energy store. A recuperation strategy or a downsizing strategy are used as operating strategies. In conjunction with the recuperation strategy, the main aim is to receive all of the energy fed back into the AC voltage circuit and thus avoid using the brake resistors. The main aim of the downsizing strategy is to limit the power requirement on the diesel-electric drive such that it would be possible to also operate the mobile wharf crane with a reduced internal combustion engine and a reduced three-phase generator without any power losses. In this downsizing strategy, the short-term energy store will generally only enter the boost state when the maximum power of the internal combustion engine is reached. In accordance with the invention, in order to optimise the energy saving, the behaviour of the double-layer capacitor and the operating states of the remaining system are defined preferentially in dependence upon the measured active power of the generator and upon the charging state of the store. By way of a controlled output of power of the short-term energy store, harsh load requirements on the internal combustion engine are obviated. The soft start prevents abrupt loading, whereby positive effects on the unsteady consumption and the exhaust emission behaviour of the internal combustion engine are produced.

Provision is also made that via the power controller the short-term energy store may be adjusted to a constant discharge power during a regular boosting of the diesel-electric drive or is adjusted via the power controller such that during boosting of the diesel-electric drive in the event of a corresponding power demand a discharge power which is higher than the constant discharge power is made available when the charging state of the short-term energy store is close to the maximum value after a charging phase. Adjusting to a constant discharge power increases the degree of efficiency of the short-term energy store during regular boosting. However, this does not preclude that within the scope of the invention during boosting the constant discharge power can be deviated from in the event of a corresponding power demand of the consumer, in particular when the charging state of the short-term energy store is close to the maximum value after a charging phase.

In accordance with one embodiment, a lower charging state limit and an upper charging state limit are defined via the power controller for the short-term energy store. Accordingly, the short-term energy store is discharged to a fixed lower charging state limit which is defined by the lower voltage adjustment range of the inverter or the useable charging state range of the short-term energy store.

The lower charging state limit is defined as 25% of the upper charging state limit. This design is also used for optimising the degree of efficiency since in the case of a higher voltage, the losses are lower owing to the internal resistance of the short-term energy store. This is taken into consideration when the operating range of the short-term energy store in voltage ranges which are as high as possible is above the defined lower charging state limit for discharging.

If, in accordance with a further feature of the invention, the power output of the short-term energy store is reduced close to the switching limit between boost operation and normal operation, then harsh loading requirements on the internal combustion engine are also obviated when disconnecting the short-term energy store. This has a positive effect on consumption and exhaust emission behaviour of the internal combustion engine.

The ability of the hybrid drive system of the crane to feed back energy is increased in an advantageous manner by virtue of the fact that the luffing mechanism includes a hydraulic cylinder and a hydraulic pump and the electric motor driving the hydraulic pump is capable of feeding back energy.

An exemplified embodiment of the invention will be explained hereinafter with reference to the accompanying drawings.

BRIEF DESCRIPTION OF THE DRAWINGS

FIG. 1 shows a view of a mobile wharf crane 1 for handling standardised containers, in particular ISO containers between land and water or vice-versa or within container terminals. The mobile wharf crane 1 can also be fitted with a gripper for handling bulk materials. The mobile wharf crane 1 consists substantially of a lower carriage 2 and an upper carriage 3 having a tower 4 and a jib 5. In a conventional manner, the mobile wharf crane 1 is supported on land, in this case a quay 7, via its lower carriage 2. The mobile wharf crane 1 can travel on the quay 7 via the lower carriage 2 by means of wheel tyre travelling mechanisms 6 and is supported on the quay via stanchions 8 during the handling operation. It is also possible for the mobile wharf crane 1 to travel on rails or to be attached in a stationary manner on a floating pontoon. Mounted on the lower carriage 2 is the upper carriage 3 which can be pivoted about a vertical rotational axis D via a rotating mechanism d. The rotating mechanism d conventionally comprises a slew ring engaged with a driving toothed wheel. The upper carriage 3 also supports a lifting mechanism h and a counterweight 9 in the rearward region. Also supported on the upper carriage 3 is the vertically extending tower 4 on whose tip a pulley head 10 is attached with cable pulleys. Further, the jib 5 is articulated on the tower 4 approximately in the region of half of its length and on the side remote from the counterweight 9. The jib 5 is connected to the tower 4 so as to be pivotable about a horizontal luffing axis W and can also be pivoted out of its laterally projecting operating position into an upright rest position via a luffing mechanism w which is articulated on the jib 5 and at the bottom on the upper carriage 3 and is conventionally formed as a hydraulic cylinder. Moreover, the jib 5 is conventionally formed as a lattice boom. Mounted in a rotatable manner on the tip of the jib 5 remote from the tower 4 are further cable pulleys via which lifting cables are guided starting from the lifting mechanism h via the pulley head 10 to the load to be lifted.

FIG. 2 shows a circuit diagram of a hybrid drive of the mobile wharf crane 1 of FIG. 1. As described in the introduction, such mobile wharf cranes can, in terms of their drive design, be serial hybrids since they operate by means of a diesel-electric drive 11 in which the chemical energy of a diesel fuel is converted into mechanical work by an internal combustion engine 11*a*. The internal combustion engine 11*a* drives a three-phase generator 11*b* which converts the mechanical energy into electrical energy and supplies it to an AC voltage circuit 12. The three-phase generator 11*b* produces a three-phase alternating current with a voltage level of 440 V. In addition to the AC voltage circuit 12, the power supply for providing energy for the different electric motors of the mobile wharf crane 1 includes a DC voltage circuit 17 which is connected to the AC voltage circuit 12 via a rectifier 16. By way of the rectifier 16, an energy exchange is possible between the AC voltage circuit 12 and the DC voltage circuit 17 if, for example, electrical energy recuperated by generator-based braking or generator-based operation of an electric motor produces excess energy in one of the voltage circuits 12, 17 and another electric motor has an energy requirement. The drive of the luffing mechanism w is connected to the AC voltage circuit 12 and different consumers, in particular the respective drives of the lifting mechanism h and the rotating mechanism d, are connected to the DC voltage circuit 17, in which consumers a new conversion of the electrical energy back into mechanical work takes place, which is used for luffing of the jib 5, lifting of loads or rotation of the mobile wharf crane 1. The lifting mechanism h and the rotating mechanism d comprise electric three-phase motors h1, d1, preferably asynchronous motors, which are each connected to the DC voltage circuit 17 via an inverter h2, d2. In the inverters h2, d2, the DC voltage is converted into AC voltage. However, it is likewise possible to connect the three-phase motors h1, d1 to the AC voltage circuit 12. For the luffing mechanism w, a three-phase motor w1 running at constant speed is connected to the AC voltage circuit 12, which drives a hydraulic pump w2, in particular an axial piston pump. The hydraulic pump w2 is connected to a hydraulic cylinder w3 via which the jib 5 of the mobile wharf crane 1 can be pivoted about the luffing axis W. The hydraulic pump w2 and the three-phase motor w1 can be formed such that excess energy cannot be returned but is rather discharged via inductors. However, it is likewise feasible that the hydraulic pump w2 and the three-phase motor w2 are capable of feeding back energy which means that energy can be returned to the AC voltage circuit 12 or even to the DC voltage circuit 17 via the rectifier 16.

Figure 1:
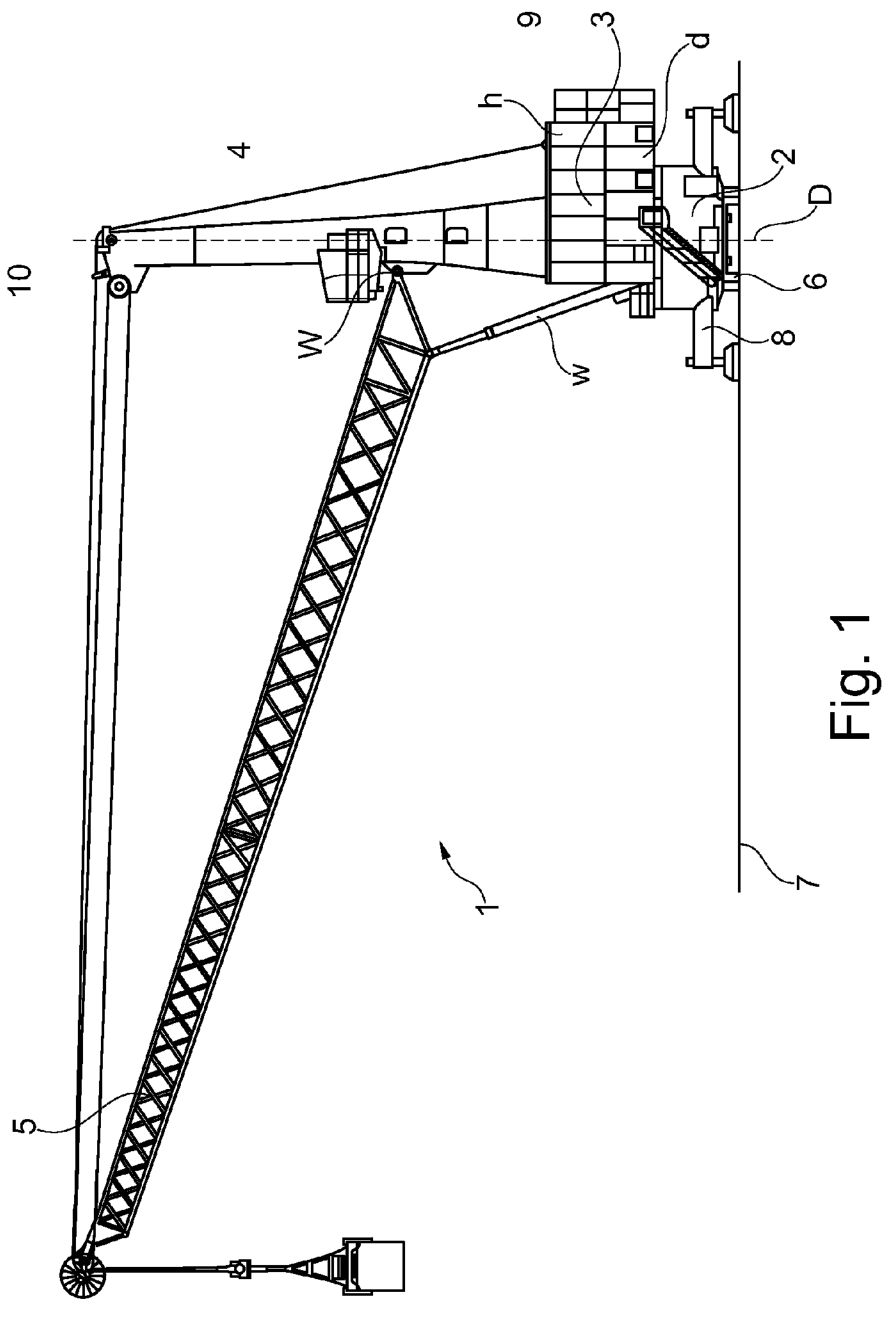
FIG. 1 shows a view of a mobile wharf crane.
Figure 2:
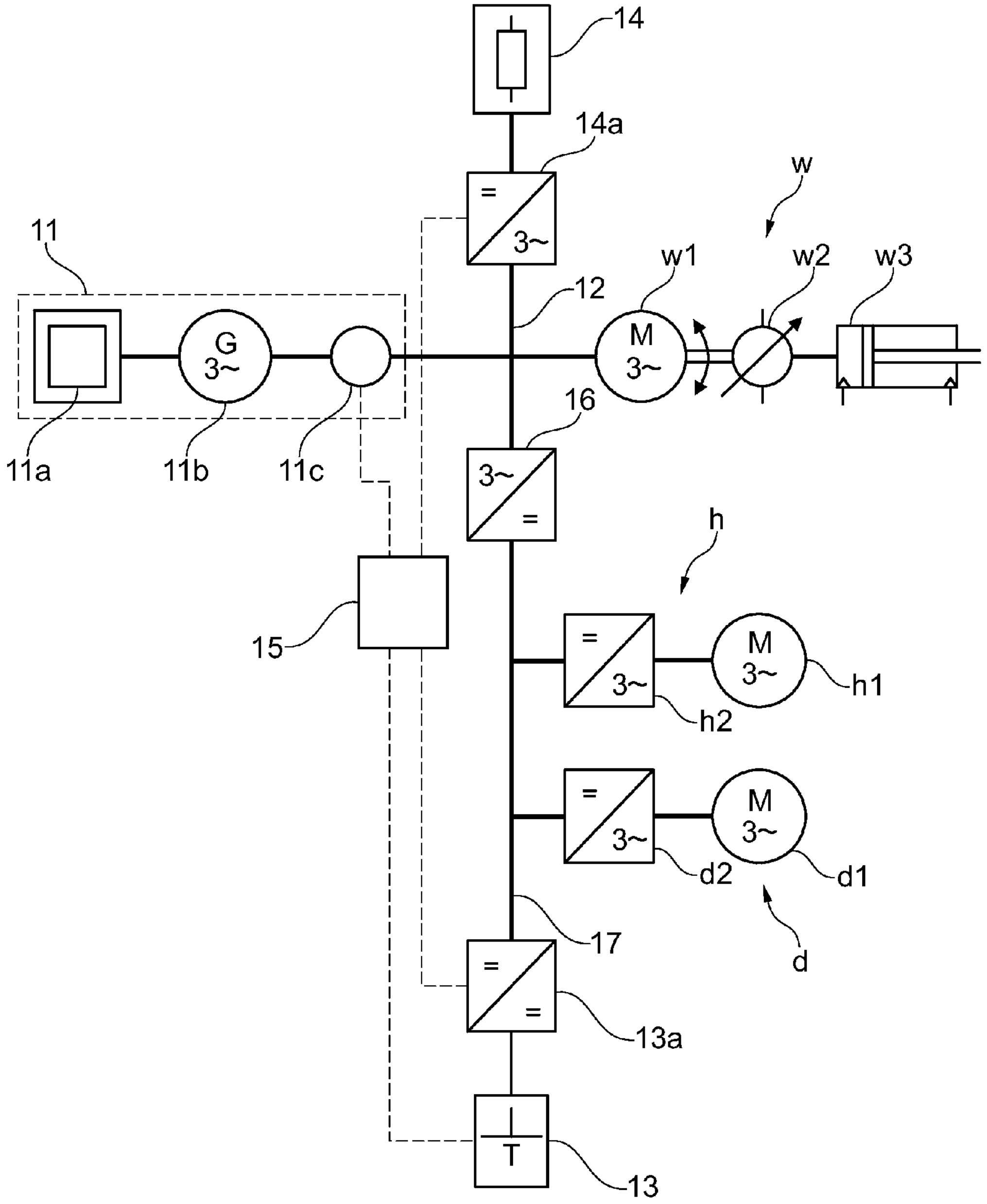
FIG. 2 shows a circuit diagram of a hybrid drive of the mobile wharf crane of FIG. 1.

Furthermore, further drives—not illustrated—are provided and are connected directly to the internal combustion engine 11*a* or are connected to the AC voltage circuit 12. For example, the traction drive for the mobile wharf crane 1 or any drives for closing and opening a four-cable bulk material gripper can be mentioned here. Corresponding drives operated by means of three-phase motors can likewise be connected to the DC voltage circuit 17 via rectifiers. It is also possible to operate these drives via DC motors and to connect them to the DC voltage circuit 17 or to the AC voltage circuit 12 via inverters. Owing to the disposition of the AC voltage circuit 12 and also the DC voltage circuit 17, it is thus possible to vary the motors used for the respective drives.

In order to recuperate the energy which during so-called generator-based braking of the three-phase motors d1, h1 and w1 is fed back into the AC voltage circuit 12 or into the DC voltage circuit 17, a short-term energy store 13 is connected to the DC voltage circuit 17. The energy which can be recuperated from this short-term energy store 13 is produced substantially during lowering and braking of the load and thus by the generator-based braking of the three-phase motor h1 of the lifting mechanism h. If a hydraulic pump w2 and a three-phase motor w1—which are both capable of feeding back energy—are used, then the energy recuperated from the hydraulic pump w2 can also be received by the short-term energy store 13. However, in principle, each of the electric motors can be formed to be capable of feeding back energy and be connected to the AC voltage circuit 12 or to the DC voltage circuit 17. Therefore, at least indirectly, both voltage circuits 12 and 17 of the energy power supply are connected to the energy store system or the short-term energy store 13.

For the instances when the short-term energy store 13 cannot store energy or further energy, a brake resistor 14 is connected to the AC voltage circuit 12. Via this brake resistor 14, the voltage fed by the generator-based braking of the three-phase motors d1, h1 and w1 back into the AC voltage circuit 12 is converted into heat and is thus not eliminated.

By incorporating the short-term energy store 13 in the DC voltage circuit 17, various new operating states for the hybrid drive of the mobile wharf crane 1 are produced. In addition to the previously conventional operating state "normal operation", i.e., the internal combustion engine 11*a* satisfies the different load requirements occurring during operation of the mobile wharf crane 1, and "resistor braking" in which the energy fed back into the AC voltage circuit 12—possibly via the DC voltage circuit 17—is converted into heat in the brake resistors 14, there are further operating states. In detail, these are the following operating states: "load point increase" in which the internal combustion engine 11*a* is operated in a more favourable operating range with an increased degree of efficiency by charging the short-term energy store 13, "boost" which relates to supporting the internal combustion engine 11*a* by the short-term energy store 13, "store braking" which relates to charging the store by the energy fed back into the AC voltage intermediate circuit 12, and "store/resistor braking" which is a mixed form of the operating states "store braking" and "resistor braking". When the short-term energy store 13 is fully charged, "resistor braking" occurs. The brake resistor 14 is connected to the AC voltage circuit 12 via a rectifier 14*a* and the brake resistor 14 can thus be switched as required. Control is effected via an overall power meter. This is advantageous in terms of energy.

The short-term energy store 13 is formed as a double-layer capacitor which is also referred to as an "Ultracap" or "Supercap". Such double-layer capacitors have a long life, are free of maintenance, are light and have a low energy density with a high power density. These are consequently particularly suitable as short-term energy stores. Compared with batteries, substantially higher powers can be received or output by the double-layer capacitors. Although the energy content per volume is smaller than that of batteries, these properties mean that double-layer capacitors are excellent as short-term energy stores for use in mobile wharf cranes since when lowering loads of a mobile wharf crane 1, extremely high powers but low energies occur over a relatively short period of time of a few seconds and for acceleration processes during lifting and other crane movements, high peak powers occur in each case only for a short time. The rotating mechanism d only feeds small amounts of energy back into the AC voltage intermediate circuit 12 since the rotating movement of the upper carriage 3 of the mobile wharf crane 1 is slow and thus the accelerating and braking processes are short and low in energy.

The short-term energy store 13 is connected to the DC voltage circuit 17 in a bidirectional manner having a DC converter 13*a* connected therebetween. The DC converter 13*a* assumes the function of adapting the voltage to the DC voltage circuit 17.

A series of further functionalities can be incorporated owing to the short-term energy store 13 which have a positive effect on the operating behaviour of the internal combustion engine 11*a*. As a result, in addition to further savings in fuel, the generated pollutant emission can also be considerably reduced. The short-term energy store 13 can permit a soft start of the internal combustion engine 11*a* by way of corresponding boosting. Abrupt, harsh load requirements on the internal combustion engine 11*a* are thus obviated. This has positive effects on the transient consumption and the exhaust emission behaviour of the internal combustion engine 11*a*. A definable motor base load is also provided in phases of positive power requirement. The internal combustion engine 11*a* is thus able to react quicker to sudden load requirements. Furthermore, it is ensured that the power of the short-term energy store 13 is gradually reduced close to the switching limit between "boost" and "normal" operation. This in turn avoids a harsh load requirement on the internal combustion engine 13 when boost operation is ended.

The short-term energy store 13 is controlled via a power controller 15, a so-called power co-ordinator, i.e., the charge/discharge power of the short-term energy store 13 is fixed in terms of amount and duration. The power controller 15 is parameterised by the operational strategy used. The power co-ordinator also controls the transition from charging the short-term energy store 13 to using the brake resistors 14. The particular task of the power controller 15 is thus to ensure that excess energy is supplied directly to the drives or three-phase motors d1, h1 and w1 connected to the AC voltage circuit 12 or the DC voltage circuit 17 in order to obviate losses occurring during intermediate storage in the short-term energy store 13. Intermediate storage is effected only when none of the consumers have an energy requirement and at the same time the short-term energy store 13 still has free charging capacity. The brake resistors 14 are thus used as an emergency system in the event that one of the drive motors or three-phase motors d1, h1 and w1 either does not have an energy requirement at the level of the fed-back energy, or the short-term energy store 13 cannot receive a corresponding amount of energy.

A recuperation strategy or a downsizing strategy is selectively used as operational strategies.

In conjunction with the recuperation strategy, the main aim is to receive all of the energy fed back into the AC voltage circuit 12 or into the DC voltage circuit 17 and thus to avoid the use of the brake resistors 14. The load point increase is not used in this operational strategy. During regular boosting, the short-term energy store 13 is discharged with constant power. This discharge power is selected to be so low that the short-term energy store 13 is discharged until the entire recuperation energy can be received in the next charge cycle. Therefore, the short-term energy store 13 has a degree of efficiency which is as high as possible. In this context, a lower SOC (state of charge) limit is defined for the discharging (charge status, 0: fully discharged, 1: fully charged), in order for the operating range of the short-term energy store 13 to be in the highest possible voltage ranges. This is also used for optimising the degree of efficiency since at a higher voltage, the losses are lower owing to the internal resistance of the short-term energy store 13. In some cases, the constant discharge power can also be deviated from during boosting. For example, in the case of a corresponding power demand, the system can be boosted to maximum discharge power when the charging state of the short-term energy store 13 is close to the maximum value after a charging phase.

The main aim of the downsizing strategy is to limit the power requirement on the diesel-electric drive 11 such that it would be possible to also operate the mobile wharf crane 1 with a reduced internal combustion engine 11*a* and a reduced three-phase generator 11*b* without any power losses. In order to ensure this, the short-term energy store 13 also receives—in addition to the energy fed back into the AC voltage circuit 12—charge by the load point increase of the internal combustion engine 11*a*. This can be controlled by an upper SOC limit. The short-term energy store 13 can be discharged to a fixed SOC lower limit. This is defined by the lower voltage adjusting range of the DC converter 13*a*—SOC>0.25—or the useable SOC range of the short-term energy store 13. In this downsizing strategy, the short-term energy store 13 will generally only enter the boost state when the maximum power of the internal combustion engine 11*a* is reached.

In addition to the operational strategy, further factors have an influence on the adjusted power of the short-term energy store 13. The DC converter 13*a* used limits the amount of possible power owing to its possible voltage adjusting range. Furthermore, the temperature of the short-term energy store 13 is monitored in order to prevent the service life being shortened due to excessive heating.

The basic principle of controlling the short-term energy store 13 with the power controller 15 is the regulation of the measured active power of the three-phase generator 11*b* to a defined desired value. Correction is effected by adjusting the store power of the short-term energy store 13. Furthermore, the power controller 15 also controls the rectifier 14*a* of the brake resistor 14. In the case where there is insufficient charge power for the short-term energy store 13, the excess power is converted into heat in the brake resistor 14. In this manner, the previously described operating states are automatically adjusted. Furthermore, the power controller 15 comprises a limiting module by means of which the selected operational strategy and thus the associated parameters are established within the power controller 15. The switching limits dependent upon the short-term energy store 13, the limiting by the voltage adjusting range of the DC converter 13*a* and the temperature monitoring are implemented therein. The variable increase represents a definable ramp time for the DC converter 13*a* of the short-term energy store 13. The soft start of the internal combustion engine 11*a* and the soft exit from the boost process are thus ensured.

Existing mobile wharf cranes 1 can be retrofitted with the short-term energy store 13 as an extension owing to its modular construction of the assemblies and functionalities. The continued presence of the brake resistors 14 in addition to the short-term energy store 13 further ensures that the mobile wharf crane 1 can continue its operation in the event that the short-term energy store 13 fails.

The power controller 15 and the operating strategy are implemented in a programmable logic controller (PLC) which controls the DC converter 13*a* and thus the short-term energy store 13. The basic principle for the power controller 15 is the analogue signal of an active power meter 11*c* which continuously measures the power output of the three-phase generator 11*b* and makes this information available to the rectifier 14*a* of the brake resistors 14 and to the DC converter 13*a* of the short-term energy store 13. The brake resistor 14 remains in the system and is used if the short-term energy store 13 fails or cannot receive the entire amount of braking energy.

The power controller 15 communicates via a bus system with a superodinate main controller—not illustrated—of the mobile wharf crane 1. Depending upon which bus systems the controllers are using, communication occurs via an interface. For example, in order to communicate with the short-term energy store 13, the power controller 15 uses a J1939 BUS and in order to communicate with the DC converter 13*a*, it uses a CAN OPEN BUS which is also used by the main controller of the mobile wharf crane 1.

LIST OF REFERENCE NUMERALS

1 Mobile wharf crane
2 Lower carriage
3 Upper carriage
4 Tower
5 Jib
6 Wheel tyre travelling mechanism
7 Quay
8 Stanchions
9 Counterweight
10 Pulley head
11 Diesel-electric drive
11*a* Internal combustion engine
11*b* Three-phase generator
11*c* Active power meter
12 AC voltage circuit
13 Short-term energy store
13*a* DC converter
14 Brake resistor
14*a* Rectifier
15 Power controller
16 Rectifier
17 DC voltage circuit
d Rotating mechanism
d1 Three-phase motor
d2 Inverter
h Lifting mechanism
h1 Three-phase motor
h2 Inverter
w Luffing mechanism
w1 Three-phase motor
w2 Hydraulic pump
w3 Hydraulic cylinder
D Rotational axis
W Luffing axis

The invention claimed is:

1. Crane, in particular a mobile wharf crane, having a diesel-electric drive, the three-phase generator of which supplies an AC voltage circuit, having a DC voltage circuit connected to the AC voltage circuit, having electric motors which drive at least a rotating mechanism, a lifting mechanism and a luffing mechanism of the crane, having at least one brake resistor and having a short-term energy store which is connected to the AC voltage circuit or to the DC voltage circuit for the intermediate storage of excess energy, wherein at least one of the electric motors is connected to the AC voltage circuit and at least one of the electric motors is connected to the DC voltage circuit and the AC voltage circuit is connected to the DC voltage circuit via a rectifier such that an energy exchange is possible between the AC voltage circuit and the DC voltage circuit.

2. Crane as claimed in claim 1, wherein at least the electric motors of the lifting mechanism and of the luffing mechanism can be operated in a generator-based manner for feeding electrical energy back into the AC voltage circuit or into the DC voltage circuit.

3. Crane as claimed in claim 2, wherein the electric motors are formed as three-phase motors.

4. Crane as claimed in claim 2, wherein at least the electric motor of the luffing mechanism is connected to the AC voltage circuit.

5. Crane as claimed in claim 4, wherein the rotating mechanism comprises a three-phase motor which is connected to the DC voltage circuit via an inverter, the lifting mechanism comprises a three-phase motor which is connected to the DC voltage circuit via an inverter, and the luffing mechanism comprises a three-phase motor which is connected directly to the AC voltage circuit.

6. Crane as claimed in claim 5, wherein a power controller which is adjusted via an operational strategy, is connected to the diesel-electric drive, the brake resistor or its rectifier, the short-term energy store and the DC converter of the short-term energy store and controls the short-term energy store and if required the brake resistor on the basis of the data of an active power meter allocated to the three-phase generator and of the charging state of the short-term energy store.

7. Crane as claimed in claim 6, wherein via the power controller the short-term energy store is adjusted to a constant discharge power during a regular boosting of the diesel-electric drive or is adjusted via the power controller such that during boosting of the diesel-electric drive in the event of a corresponding power demand a discharge power which is higher than the constant discharge power is made available when the charging state of the short-term energy store is close to the maximum value after a charging phase.

8. Crane as claimed in claim 7, wherein a lower charging state limit and an upper charging state limit are defined via the power controller for the short-term energy store.

9. Crane as claimed in claim 6, wherein via the power controller the power output of the short-term energy store is reduced close to the switching limit between boost operation and normal operation of the diesel-electric drive.

10. Crane as claimed in claim 1, wherein the short-term energy store is connected to the DC voltage circuit via a DC converter.

11. Crane as claimed in claim 10, wherein the short-term energy store is formed as a double-layer capacitor.

12. Crane as claimed in claim 1, wherein the brake resistor is connected to the AC voltage circuit via a rectifier.

13. Crane as claimed in claim 12, wherein a power controller which is adjusted via an operational strategy, is connected to the diesel-electric drive, the brake resistor or its rectifier, the short-term energy store and the DC converter of the short-term energy store and controls the short-term energy store and if required the brake resistor on the basis of the data of an active power meter allocated to the three-phase generator and of the charging state of the short-term energy store.

14. Crane as claimed in claim 13, wherein via the power controller the short-term energy store is adjusted to a constant discharge power during a regular boosting of the diesel-electric drive or is adjusted via the power controller such that during boosting of the diesel-electric drive in the event of a corresponding power demand a discharge power which is higher than the constant discharge power is made available when the charging state of the short-term energy store is close to the maximum value after a charging phase.

15. Crane as claimed in claim 13, wherein a lower charging state limit and an upper charging state limit are defined via the power controller for the short-term energy store.

16. Crane as claimed in claim 15, wherein the lower charging state limit is defined as 25% of the upper charging state limit.

17. Crane as claimed in claim 13, wherein via the power controller the power output of the short-term energy store is reduced close to the switching limit between boost operation and normal operation of the diesel-electric drive.

18. Crane as claimed in claim 1, wherein at least the electric motor of the luffing mechanism is connected to the AC voltage circuit.

19. Crane as claimed in claim 1, wherein the rotating mechanism comprises a three-phase motor which is connected to the DC voltage circuit via an inverter, the lifting mechanism comprises a three-phase motor which is connected to the DC voltage circuit via an inverter, and the luffing mechanism comprises a three-phase motor which is connected directly to the AC voltage circuit.

20. Crane as claimed in claim 1, wherein the luffing mechanism includes a hydraulic cylinder and a hydraulic pump and the electric motor driving the hydraulic pump is capable of feeding back energy.

21. Crane as claimed in claim 1, wherein the short-term energy store is formed as a double-layer capacitor.

22. Crane as claimed in claim 21, wherein the brake resistor is connected to the AC voltage circuit via a rectifier.

* * * * *